US010870712B2

(12) United States Patent
Song et al.

(10) Patent No.: US 10,870,712 B2
(45) Date of Patent: Dec. 22, 2020

(54) METHOD FOR PREPARING POLYOLEFIN

(71) Applicant: LG CHEM, LTD., Seoul (KR)

(72) Inventors: Eun Kyoung Song, Daejeon (KR); Yong Ho Lee, Daejeon (KR); Kyung Jin Cho, Daejeon (KR); Yi Young Choi, Daejeon (KR); Ki Soo Lee, Daejeon (KR); Heon Yong Kwon, Daejeon (KR); Young Suk You, Daejeon (KR)

(73) Assignee: LG CHEM. LTD., Seoul (KR)

( * ) Notice: Subject to any disclaimer, the term of this patent is extended or adjusted under 35 U.S.C. 154(b) by 0 days.

(21) Appl. No.: 15/552,658

(22) PCT Filed: Jun. 10, 2016

(86) PCT No.: PCT/KR2016/006201
§ 371 (c)(1),
(2) Date: Aug. 22, 2017

(87) PCT Pub. No.: WO2016/204457
PCT Pub. Date: Dec. 22, 2016

(65) Prior Publication Data
US 2018/0037676 A1    Feb. 8, 2018

(30) Foreign Application Priority Data

Jun. 15, 2015 (KR) .................. 10-2015-0084240
Feb. 22, 2016 (KR) .................. 10-2016-0020498

(51) Int. Cl.
| | |
|---|---|
| C08F 4/653 | (2006.01) |
| C08F 4/6592 | (2006.01) |
| C08F 210/16 | (2006.01) |
| C08F 4/6192 | (2006.01) |
| C08F 4/02 | (2006.01) |
| C08F 4/649 | (2006.01) |
| C08F 4/659 | (2006.01) |
| C08F 10/00 | (2006.01) |

(52) U.S. Cl.
CPC .......... *C08F 4/61922* (2013.01); *C08F 4/02* (2013.01); *C08F 4/649* (2013.01); *C08F 4/659* (2013.01); *C08F 10/00* (2013.01); *C08F 4/65912* (2013.01); *C08F 2410/01* (2013.01); *C08F 2410/03* (2013.01); *C08F 2420/02* (2013.01); *C08F 2500/04* (2013.01)

(58) Field of Classification Search
CPC ............. C08F 4/75904; C08F 4/65912; C08F 4/65927; C08F 210/16
See application file for complete search history.

(56) References Cited

U.S. PATENT DOCUMENTS

| | | |
|---|---|---|
| 6,153,550 A | 11/2000 | Kissin |
| 2004/0038807 A1 | 2/2004 | McDaniel et al. |
| 2006/0052587 A1 | 3/2006 | Damrau et al. |
| 2006/0287449 A1 | 12/2006 | Miyamoto et al. |
| 2007/0197374 A1 | 8/2007 | Yang et al. |
| 2010/0041842 A1 | 2/2010 | Yang et al. |
| 2010/0331505 A1 | 12/2010 | Masino et al. |
| 2011/0201770 A1 | 8/2011 | Yang et al. |
| 2013/0079477 A1 | 3/2013 | Masino et al. |
| 2013/0245210 A1 | 9/2013 | Masino et al. |
| 2013/0289227 A1 | 10/2013 | Jensen et al. |
| 2014/0235804 A1 | 8/2014 | Masino et al. |
| 2015/0299352 A1 | 10/2015 | Sohn et al. |
| 2016/0222139 A1 | 8/2016 | Cho et al. |
| 2016/0237187 A1 | 8/2016 | Hong et al. |

FOREIGN PATENT DOCUMENTS

| | | |
|---|---|---|
| EP | 3037167 A1 | 6/2016 |
| EP | 3255066 A1 | 12/2017 |
| JP | 2732346 B2 | 3/1998 |
| JP | 2000-239310 A | 9/2000 |
| JP | 3773299 B2 | 5/2006 |
| JP | 4571500 B2 | 10/2010 |
| JP | 2014-505771 A | 3/2014 |
| JP | 2014-185287 A | 10/2014 |
| KR | 10-2005-0117544 A | 12/2005 |
| KR | 10-0581781 B1 | 5/2006 |
| KR | 10-0679766 B1 | 2/2007 |
| KR | 10-2008-0104331 A | 12/2008 |
| KR | 10-2011-0015737 A | 2/2011 |
| KR | 10-2012-0076156 A | 7/2012 |
| KR | 10-2012-0110187 A | 10/2012 |
| KR | 10-2012-0111530 A | 10/2012 |
| KR | 10-2013-0019793 A | 2/2013 |
| KR | 10-2014-0041162 A | 4/2014 |
| KR | 10-2014-0067410 A | 6/2014 |
| KR | 10-2014-0071142 A | 6/2014 |
| KR | 10-2014-0114310 A | 9/2014 |
| KR | 10-1437509 B1 | 9/2014 |
| KR | 10-2015-0045369 A | 4/2015 |

(Continued)

OTHER PUBLICATIONS

Mehdiabadi et al. "Synthesis of Polyolefins with Combined Single-Site Catalysts", Macromol. Symp. 2012, vol. 313-314, pp. 8-18.

(Continued)

*Primary Examiner* — Caixia Lu

(74) *Attorney, Agent, or Firm* — Dentons US LLP

(57) ABSTRACT

The present invention provides a method for preparing a polyolefin having a broad molecular weight distribution. More specifically, the present invention provides a method for preparing a polyolefin having a broad molecular weight distribution and an ultra-high molecular weight in which an organometallic complex containing a specific Ti—Al complex structure is used as a molecular weight controller (i.e., molecular weight enhance) in the polymerization of an olefin monomer, thereby enabling both solution polymerization and slurry polymerization, particularly enabling the molecular weight distribution to be more readily and effectively controlled.

10 Claims, No Drawings

(56) References Cited

FOREIGN PATENT DOCUMENTS

| KR | 10-2015-0059125 A | 5/2015 |
|---|---|---|
| WO | 2012/097146 A1 | 7/2012 |
| WO | 2015076618 A1 | 5/2015 |

OTHER PUBLICATIONS

Bogaert et al, "Neodymium(III) Complexes with Bulky ansa-Bis(cyclopentadienyl) Ligands: Synthesis and Use in Olefin Oligomerization", Organometallics, 2001, vol. 20, No. 1, pp. 199-205.

Janiak, "Metallocene and related catalysts for olefin, alkyne and silane dimerization and oligomerization", Coordination Chemistry Reviews, 2006, vol. 250, No. 1-2, pp. 66-94.

Alexakis, "Mild Protection and Deprotection of Alcohols as Ter-Butyl Ethers in the Field of Pheromone Synthesis", Tetrahedron Letters, vol. 29, No. 24, pp. 2951-2954, 1988.

METHOD FOR PREPARING POLYOLEFIN

CROSS-REFERENCE TO RELATED APPLICATION(S)

This application is a National Stage Entry of International Application No. PCT/KR2016/006201 filed on Jun. 10, 2016, and claims the benefit of Korean Application No. 10-2015-0084240 filed on Jun. 15, 2015, and Korean Application No. 10-2016-0020498 filed on Feb. 22, 2016, all of which are hereby incorporated by reference in their entirety for all purposes as if fully set forth herein.

TECHNICAL FIELD

The present invention relates to a method for preparing a polyolefin in which an organometallic compound having a specific structure is used, thereby enabling both solution polymerization and slurry polymerization, and in the case of slurry polymerization, a catalyst obtained by supporting the organometallic compound is used, thereby exhibiting higher performance than that of existing metallocene catalyst and, particularly, enabling the molecular weight of the olefin to be more easily increased, even without separately injecting an additive for increasing the molecular weight.

BACKGROUND OF ART

Metallocenes using Group 4 transition metals have been widely used for some organic catalytic reactions and polymer reactions of various olefins. Particularly, when metallocenes are used for the polymer reaction of olefins, research on the structural modification from the viewpoint of a single active site catalyst has been steadily carried out. Metallocene has been studied for many industrial applications because it is easy to control very excellent catalytic activity, molecular weight, molecular weight distribution and the like, compared with conventional Ziegler-Natta catalysts.

In order to apply metallocene to the process, there are some problems that must be improved first, and one of the important research concerns is a technology for producing high molecular weight polyolefin. In the case of a catalyst system which produces a large number of high molecular weight products, there are disadvantages that a complicated ligand synthesis process must be performed, and the polymerization activity is deteriorated unless process conditions are adjusted.

In order to solve these problems and to increase the activity and the molecular weight of the metallocene catalyst, adjustment of the cocatalyst, supporting conditions and additives can be carried out. However, in the case of adjusting the additives, only limited types of materials are applied in the actual process. As an additive injected in the existing process, alkylaluminum is typical. This material is used to remove impurities such as moisture in the process, and when used with a certain level or higher, there is a disadvantage that the activity of metallocene catalyst is reduced.

On the other hand, Korean Patent Laid-open Publication No. 2005-0117544 discloses a method of using a metallocene-based catalyst and a Tebbe reagent during polymerization, in order to produce an ethylene-based polymer having an ultra high molecular weight of 1,000,000 or higher. However, the above method focuses solely on the production of an ultra-high molecular weight ethylene-based polymer, and in the case of the produced polyethylene, its application field and production process itself are extremely limited. In addition, since the polymer according to the above method is an ultra-high molecular weight polymer having a very narrow molecular weight distribution, there are problems that the processability is deteriorated, a subsequent processing is difficult and the market size is small.

DETAILED DESCRIPTION OF THE INVENTION

Technical Problem

It is an object of the present invention to provide a method for preparing a polyolefin using an organometallic complex having a specific structure which can exhibit an improved solubility, thereby exhibiting excellent action and effect in both slurry polymerization and solution polymerization even when used with a small amount compared with conventional ones.

It is another object of the present invention to provide a method for preparing a polyolefin capable of improving the deterioration of polymerization catalyst performance, allowing the molecular weight distribution to be adjusted more easily, and exhibiting various molecular weight distributions.

Technical Solution

In order to achieve the objects, the present invention provides a method for preparing a polyolefin comprising polymerizing an olefin monomer in the presence of a metallocene catalyst comprising a metallocene compound, a cocatalyst and a compound of the following chemical formula 1 which is a molecular weight enhancer.

[Chemical Formula 1]

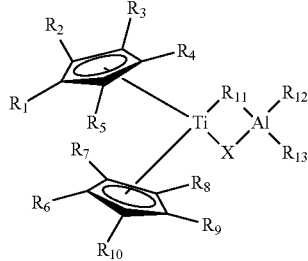

(in the Chemical Formula 1, $R_1$ to $R_{10}$ are each independently hydrogen, a linear or branched alkyl, alkoxy or alkoxyalkyl having 1 to 10 carbon atoms, $R_{11}$ is a linear or branched alkylene group having 1 to 10 carbon atoms, or halogen, $R_{12}$ and $R_{13}$ are each independently a linear or branched alkyl group having 1 to 10 carbon atoms, or halogen, and X is a halogen atom.)

In the chemical formula 1, at least one of $R_1$ to $R_{10}$ may be an alkoxyalkyl having 1 to 10 carbon atoms. Further, in the chemical formula 1, at least one of $R_1$ to $R_{10}$ is preferably an alkoxyalkyl having 8 to 10 carbon atoms. In addition, in the chemical formula 1, $R_{11}$ is a branched alkylene group having 4 to 10 carbon atoms, and $R_{12}$ and $R_{13}$ are each independently a branched alkyl group having 4 to 10 carbon atoms.

The chemical formula 1 may be prepared by reacting a compound of the following chemical formula 2 with an organoaluminum compound of the following chemical formula 3 in a solvent.

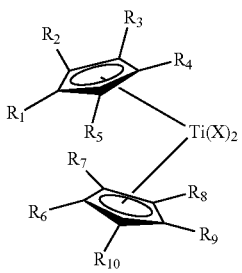

[Chemical Formula 2]

(in the Chemical Formula 2, $R_1$ to $R_{10}$ are each independently hydrogen, a linear or branched alkyl, alkoxy or alkoxyalkyl having 1 to 10 carbon atoms, and X is halogen);

  [Chemical Formula 3]

(in the Chemical Formula 3, $R_{11}$, $R_{12}$ and $R_{13}$ are each independently a linear or branched alkyl group having 1 to 10 carbon atoms, or halogen, and at least one of $R_{11}$, $R_{12}$ and $R_{13}$ is a linear or branched alkyl group having 1 to 10 carbon atoms.)

In addition, the metallocene catalyst may further include a support. Thus, the metallocene catalyst may include a metallocene compound, a cocatalyst, and a metallocene supported catalyst in which a compound of the chemical formula 1 is supported on the cocatalyst.

The step of polymerizing the olefin monomer may include solution polymerization or slurry polymerization.

In the present invention, the solution polymerization may comprise a step of performing solution polymerization of an olefin-based monomer in a solvent-containing reactor in the presence of a metallocene catalyst comprising a metallocene compound, a cocatalyst and a compound of the chemical formula 1. In addition, the compound of the chemical formula 1 may be injected into the reactor via a separate inlet during polymerization of the olefin monomer.

In addition, in the present invention, the slurry polymerization may include a step of injecting a metallocene-supported catalyst comprising a metallocene compound supported on a support, a cocatalyst and a compound of the chemical formula 1 in one reactor, and then performing slurry polymerization while adding the olefin-based monomer to the reactor.

Advantageous Effects

According to the present invention, an ultra-high molecular weight polyolefin having a broad molecular weight distribution and a very high molecular weight can be produced by using an organometallic complex containing a specific Ti—Al complex structure as a molecular weight controller (i.e., molecular weight enhance), supporting it on a support together with a cocatalyst to produce a metallocene catalyst, and then utilizing the metallocene catalyst for the polymerization of an olefin monomer.

In addition, due to the improved solubility, the present invention enable the molecular weight distribution to be more readily and effectively controlled in both slurry polymerization and solution polymerization even when used with a small amount compared with conventional ones. Further, the present invention can improve deterioration of performance (activity and copolymerizability) of the polymerization catalyst. In addition, in the case of a supported catalyst in which the organometallic complex is immobilized on the support, it can be used for slurry polymerization, and in this case, a high molecular weight polyolefin having a higher performance than that of the conventional metallocene catalyst can be produced without separately injecting an additive. Further, in the present invention, the molecular weight distribution can be adjusted by using one kind of metallocene catalyst.

DETAILED DESCRIPTION OF THE EMBODIMENTS

Hereinafter, the invention will be described in more detail. It should be understood that the terms or words used in the specification and the appended claims should not be construed as limited to general and dictionary meanings, but interpreted based on the meanings and concepts conforming to technical aspects of the present invention on the basis of the principle that the inventor is allowed to define terms appropriately for the best explanation.

In the present specification, the terms "include" or "comprise", etc. are used to embody specific features, regions, integers, steps, operations, elements and/or components, and are not intended to exclude the presence or addition of other specific features, regions, integers, steps, operations, elements and/or components.

Hereinafter, a method of preparing a supported metallocene catalyst according to one preferred embodiment of the present invention will be described in more detail.

According to one embodiment of the present invention, there is provided a method for preparing a polyolefin comprising polymerizing an olefin monomer in the presence of a metallocene catalyst comprising a metallocene compound, a cocatalyst and a compound of the following chemical formula 1:

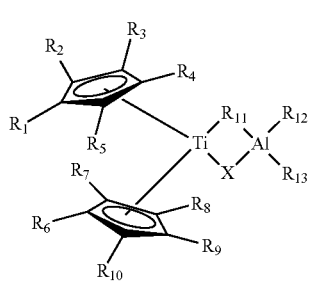

[Chemical Formula 1]

(in the Chemical Formula 1, $R_1$ to $R_{10}$ are each independently hydrogen, a linear or branched alkyl, alkoxy or alkoxyalkyl having 1 to 10 carbon atoms, $R_{11}$ is a linear or branched alkylene group having 1 to 10 carbon atoms, or halogen, $R_{12}$ and $R_{13}$ are each independently a linear or branched alkyl group having 1 to 10 carbon atoms, or halogen, and X is a halogen atom.)

The present invention relates to an organometallic complex for the production of polyethylene having increased molecular weight and a production technique of a supported catalyst using the same. The present invention also relates to a method for adjusting the molecular weight and molecular weight distribution of a polyolefin using the supported catalyst.

The present invention can facilitate the adjustment of the molecular weight distribution and provide excellent compolymerizability without deteriorating the catalytic performance by using an organometallic compound having a specific structure as a molecular weight enhancer (MWE) during the preparation of the polyolefin. Therefore, in the present invention, the organometallic complex is used as a molecular weight enhancer, and may mean the role of a molecular weight modifier or an additional cocatalyst.

Such organometallic compound of the present invention forms a specific Ti—Al complex structure in its structure, as represented by the chemical formula 1. Since the compound of the chemical formula 1 serves to improve the solubility in a solvent due to the specificity of the structure, even when used with a smaller amount compared with conventional ones during the solution polymerization, the catalyst performance can be more improved and the molecular weight can be more easily adjusted than the case of using other transition metals.

In addition, the compound of the chemical formula 1 can exhibit an effect of increasing the molecular weight even when used with the same amount as a conventional Tebbe reagent, so that polyethylene can be efficiently produced. Further, when the compound of the chemical formula 1 is added to the solution polymerization, a molecular weight increasing effect can be exhibited even if the amount of use is reduced by 50% compared with the conventional one. Further, the compound of the chemical formula 1 assists the activity of the metallocene catalyst to enable the production of polyolefin having a larger molecular weight and a broader molecular weight distribution.

Moreover, the compound of the chemical formula 1 can exhibit superior solubility not only in an aliphatic hydrocarbon-based organic solvent such as hexane but also in a general aromatic hydrocarbon, compared with conventional ones. Therefore, the compound of the chemical formula 1 can be used for both solution polymerization and slurry polymerization. In particular, when the compound of the chemical formula 1 is used for slurry polymerization, the compound is not added separately to the reactor but it is used by supporting on the support together with the metallocene compound, thereby exhibiting excellent catalytic activity even without separately using an additive for increasing the molecular weight.

Therefore, in the present invention, after the catalyst obtained by supporting the organometallic compound of the chemical formula 1 is injected into one reactor, slurry polymerization can be carried out while injecting the olefin monomer into the reactor. Therefore, the polyolefin having a broad molecular weight distribution and a high molecular weight or ultra-high molecular weight can be produced in a large amount by a simple method. That is, the present invention is used for slurry polymerization in the state where both the metallocene compound and the compound of the chemical formula 1 are supported on the support. The metallocene supported catalyst of the present invention is characterized in that the compound of the chemical formula 1 is more effectively supported than when a molecular weight modifier is added separately as in the conventional one, thereby increasing the catalyst performance by improving the structure.

The compound of the chemical formula 1 can be stably dissolved in an organic solvent used as a reaction medium or a diluent, and then fed to the reaction system. In particular, when $R_1$ to $R_{10}$ are an alkyl or an alkoxy, the properties of being supported on the supported catalyst are enhanced, and while the compound does not separate from the solvent of the polymerization process, the action and effect thereof are more uniformly and excellently expressed during the alkyl polymerization process.

In this case, at least one of $R_1$ to $R_{10}$ in the chemical formula 1 is preferably an alkoxyalkyl having 1 to 10 carbon atoms. Further, at least of $R_1$ to $R_{10}$ in the chemical formula 1 is more preferably an alkoxyalkyl having 8 to 10 carbon atoms. For example, at least one of $R_1$ to $R_{10}$ in the chemical formula 1 may have a t-butoxy-hexyl group.

Further, in the chemical formula 1, $R_{11}$ is preferably an alkylene having 4 to 10 carbon atoms, and $R_{12}$ and $R_{13}$ are each independently a branched alkyl group having 4 to 10 carbon atoms. For example, in the chemical formula 1, $R_{11}$ may be a triisobutylene group derived from a triisobutyl group, and $R_{12}$ and $R_{13}$ may be each independently a triisobutyl group.

The compound of the chemical formula 1 may be used in a molar ratio of about 0.05 to 1, or a molar ratio of about 0.1 to 0.5 with respect to 1 mole of the transition metal contained in the metallocene compound. If the amount of the compound of formula 1 used is excessively small, it may be difficult to produce a polyolefin having an ultra-high molecular weight properly. Conversely, when the amount of the compound of the chemical formula 1 used is excessively large, a polyolefin having a larger molecular weight can be produced, but the catalytic activity may be lowered. Therefore, it is desirable to use the compound of the chemical formula 1 in the above molar ratio.

The compound of the chemical formula 1 may be prepared by reacting a compound of the following chemical formula 2 and an organoaluminum compound of the chemical formula 3 in a solvent.

[Chemical Formula 2]

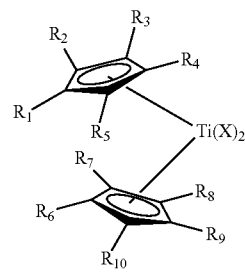

(in the Chemical Formula 2, $R_1$ to $R_{10}$ are each independently hydrogen, a linear or branched alkyl, alkoxy or alkoxyalkyl having 1 to 10 carbon atoms, and
X is halogen);

$R_{11}R_{12}R_{13}Al$                      [Chemical Formula 3]

(in the Chemical Formula 3,
$R_{11}$, $R_{12}$ and $R_{13}$ are each independently a linear or branched alkyl group having 1 to 10 carbon atoms, or a halogen, and at least one of $R_{11}$, $R_{12}$ and $R_{13}$ is a linear or branched alkyl group having 1 to 10 carbon atoms.)

The compound of the chemical formula 2 and the compound of the chemical formula 3 are used preferably in a molar ratio of about 1:1 to 1:3, or about 1:1.5 to 1:2.5, based on the molar ratio of Ti contained in the chemical formula 2 and aluminum contained in the chemical formula 3. Most preferably, the compound of the chemical formula 2 and the compound of the chemical formula 3 may be used such that the molar ratio of Ti contained in the chemical formula 2 and aluminum contained in the chemical formula 3 is 1:2.

Further, the preparation method of the compound of the chemical formula 1 can proceed in a solvent, and the kind of the solvent is not particularly limited. For example, the reaction can be carried out using a hydrocarbon-based solvent having 5 to 20 carbon atoms, or an aromatic solvent having 6 to 20 carbon atoms under an inert atmosphere.

The production method of the compound of the chemical formula 1 may proceed at a temperature of from room temperature to 50° C. for 2 days to 5 days, but the conditions are not limited.

On the other hand, according to the present invention, the metallocene catalyst used for the olefin polymerization may further include a support well known in the art. For example, the support may be selected from the group consisting of silica, silica-alumina, and silica-magnesia. The metallocene catalyst according to an embodiment of the present invention may include the metallocene compound, the cocatalyst and the compound of formula (1), and optionally may include the metallocene compound, the cocatalyst and a metallocene supported catalyst in which the compound of the chemical formula 1 is supported on the cocatalyst.

In the present invention, when the metallocene supported catalyst in which the compound of the formula (1) is supported on the support together with the metallocene compound is used, the polyolefin can be prepared by a slurry polymerization. When the compound of the chemical formula 1 is used separately, the polyolefin can be prepared by a solution polymerization method.

Therefore, the step of polymerizing the olefin monomer may include solution polymerization or slurry polymerization. That is, the compound of the chemical formula 1 described above may be used in a state of being supported on a support together with a metallocene compound to be described later, but may be used by separately adding and mixing to a reactor containing a metallocene compound and a cocatalyst in the reaction system during the polymerization reaction. Most preferably, the step of polymerizing the olefin monomer may include slurry polymerization. That is, according to the present invention, the compound of the chemical formula 1 and the metallocene compound are used in the form of being supported on a support, whereby a polyolefin having a broad molecular weight distribution and excellent catalytic activity and various molecular weights can be produced.

According to a preferred embodiment of the present invention, the solution polymerization may include a step of performing solution polymerization of the olefin-based monomer in a solvent-containing reactor in the presence of a metallocene catalyst comprising a metallocene compound, a cocatalyst and a compound of the chemical formula 1. The compound of the chemical formula 1 may be added to the reactor through a separate inlet during polymerization of the olefin monomer.

According to another preferred embodiment of the present invention, the slurry polymerization may include a step of introducing a metallocene supported catalyst comprising a metallocene compound supported on a support, a cocatalyst and a compound of the chemical formula 1 into one reactor and then performing slurry polymerization while adding an olefin-based monomer to the reactor.

Meanwhile, in the method for preparing a polyolefin according to the present invention, the metallocene compound contained in the metallocene catalyst may be any one or more selected from the compounds represented by the following formulas 4 to 6.

$$(Cp^1R^a)_n(Cp^2R^b)M^1Z^1_{3-n}$$ [Chemical Formula 4]

in the Chemical Formula 4, $M^1$ is a Group 4 transition metal;

$Cp^1$ and $Cp^2$ are the same as or different from each other and are each independently any one selected from the group consisting of cyclopentadienyl, indenyl, 4,5,6,7-tetrahydro-1-indenyl, and fluorenyl radical, each of which may be substituted with hydrocarbon having 1 to 20 carbon atoms;

$R^a$ and $R^b$ are the same as or different from each other and are each independently hydrogen, a $C_1$-$C_{20}$ alkyl, a $C_1$-$C_{10}$ alkoxy, a $C_2$-$C_{20}$ alkoxyalkyl, a $C_6$-$C_{20}$ aryl, a $C_6$-$C_{10}$ aryloxy, a $C_2$-$C_{20}$ alkenyl, a $C_7$-$C_{40}$ alkylaryl, a $C_7$-$C_{40}$ arylalkyl, a $C_8$-$C_{40}$ arylalkenyl, or a $C_2$-$C_{10}$ alkynyl;

$Z^1$ is a halogen atom, a $C_1$-$C_{20}$ alkyl, a $C_2$-$C_{10}$ alkenyl, a $C_7$-$C_{40}$ alkylaryl, a $C_7$-$C_{40}$ arylalkyl, a $C_6$-$C_{20}$ aryl, a substituted or unsubstituted $C_1$-$C_{20}$ alkylidene, a substituted or unsubstituted amino group, a $C_2$-$C_{20}$ alkylalkoxy, or a $C_7$-$C_{40}$ arylalkoxy; and n is 1 or 0;

$$(Cp^3R^c)_mB^1(Cp^4R^d)M^2Z^2_{3-m}$$ [Chemical Formula 5]

in the Chemical Formula 5, $M^2$ is a Group 4 transition metal;

$Cp^3$ and $Cp^4$ are the same as or different from each other and are each independently any one selected from the group consisting of cyclopentadienyl, indenyl, 4,5,6,7-tetrahydro-1-indenyl, and fluorenyl radical, each of which may be substituted by hydrocarbon having 1 to 20 carbon atoms;

$R^c$ and $R^d$ are the same as or different from each other and are each independently hydrogen, a $C_1$-$C_{20}$ alkyl, a $C_1$-$C_{10}$ alkoxy, a $C_2$-$C_{20}$ alkoxyalkyl, a $C_6$-$C_{20}$ aryl, a $C_6$-$C_{10}$ aryloxy, a $C_2$-$C_{10}$ alkenyl, a $C_7$-$C_{40}$ alkylaryl, a $C_7$-$C_{40}$ arylalkyl, a $C_8$-$C_{40}$ arylalkenyl, or a $C_2$-$C_{10}$ alkynyl;

$Z^2$ is a halogen atom, a $C_1$-$C_{20}$ alkyl, a $C_2$-$C_{10}$ alkenyl, a $C_7$-$C_{40}$ alkylaryl, a $C_7$-$C_{40}$ arylalkyl, a $C_6$-$C_{20}$ aryl, a substituted or unsubstituted $C_1$-$C_{20}$ alkylidene, a substituted or unsubstituted amino group, a $C_2$-$C_{20}$ alkylalkoxy, or a $C_7$-$C_{40}$ arylalkoxy;

$B^1$ is at least one of carbon, germanium, silicon, phosphorus or nitrogen atom containing radicals, or a combination thereof, which crosslinks $Cp^3R^c$ ring and $Cp^4R^d$ ring or crosslinks one $Cp^4R^d$ ring to $M^2$;

m is 1 or 0;

$$(Cp^5R^e)B^2(J)M^3Z^3_2$$ [Chemical Formula 6]

in the Chemical Formula 6, $M^3$ is a Group 4 transition metal;

$Cp^5$ is any one selected from the group consisting of cyclopentadienyl, indenyl, 4,5,6,7-tetrahydro-1-indenyl, and fluorenyl radical, each of which may be substituted with hydrocarbon having 1 to 20 carbon atoms;

$R^e$ is hydrogen, a $C_1$-$C_{20}$ alkyl, a $C_1$-$C_{10}$ alkoxy, a $C_2$-$C_{20}$ alkoxyalkyl, a $C_6$-$C_{20}$ aryl, a $C_6$-$C_{10}$ aryloxy, a $C_2$-$C_{20}$ alkenyl, a $C_7$-$C_{40}$ alkylaryl, a $C_7$-$C_{40}$ arylalkyl, a $C_8$-$C_{40}$ arylalkenyl, or a $C_2$-$C_{10}$ alkynyl;

$Z^3$ is a halogen atom, a $C_1$-$C_{20}$ alkyl, a $C_2$-$C_{10}$ alkenyl, a $C_7$-$C_{40}$ alkylaryl, a $C_7$-$C_{40}$ arylalkyl, a $C_6$-$C_{20}$ aryl, a substituted or unsubstituted $C_1$-$C_{20}$ alkylidene, a substituted or unsubstituted amino group, a $C_2$-$C_{20}$ alkylalkoxy, or a $C_7$-$C_{40}$ arylalkoxy;

$B^2$ is at least one of carbon, germanium, silicon, phosphorus or nitrogen atom containing radicals, or a combination thereof, which crosslinks $Cp^5R^e$ ring and J; and J is any one selected from the group consisting of $NR^f$, O, $PR^f$ and S, where the $R^f$ is $C_1$-$C_{20}$ alkyl, aryl, substituted alkyl or substituted aryl.

In the chemical formula 5, when m is 1, it means a bridged compound structure in which $Cp^3R^c$ ring and $Cp^4R^d$ or $Cp^4R^d$ ring and $M^2$ are crosslinked by $B^1$, and when m is 0, it means a non-crosslinked compound structure.

The metallocene compound represented by the chemical formula 4 may be, for example, a compound represented by the following structural formulas, but is not limited thereto.
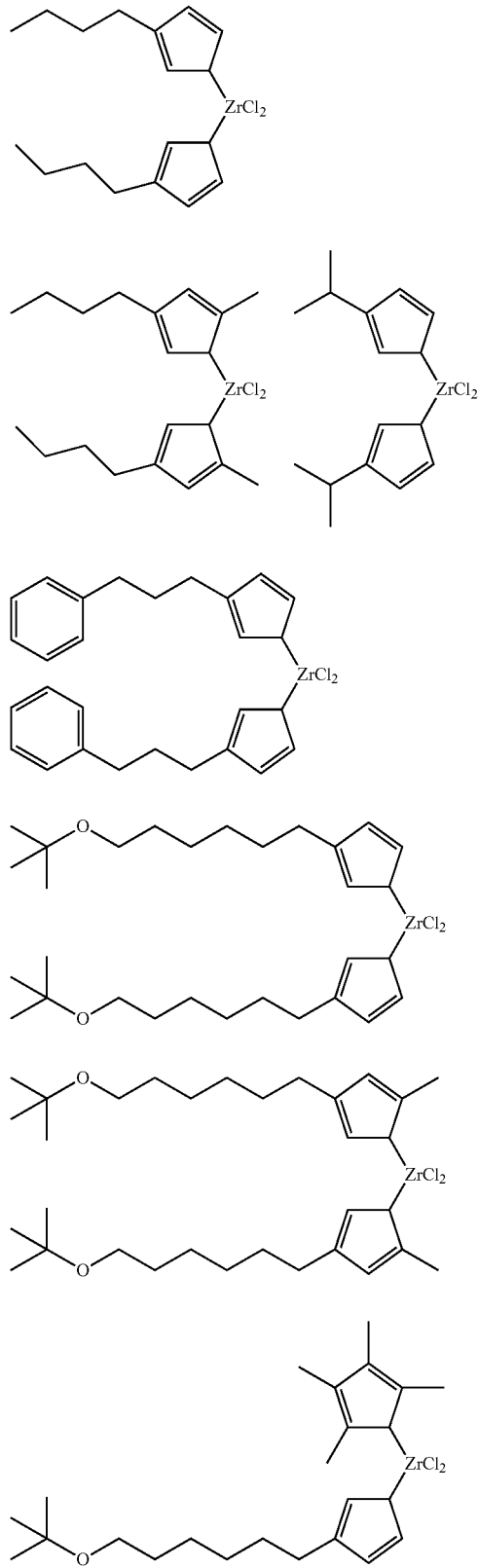
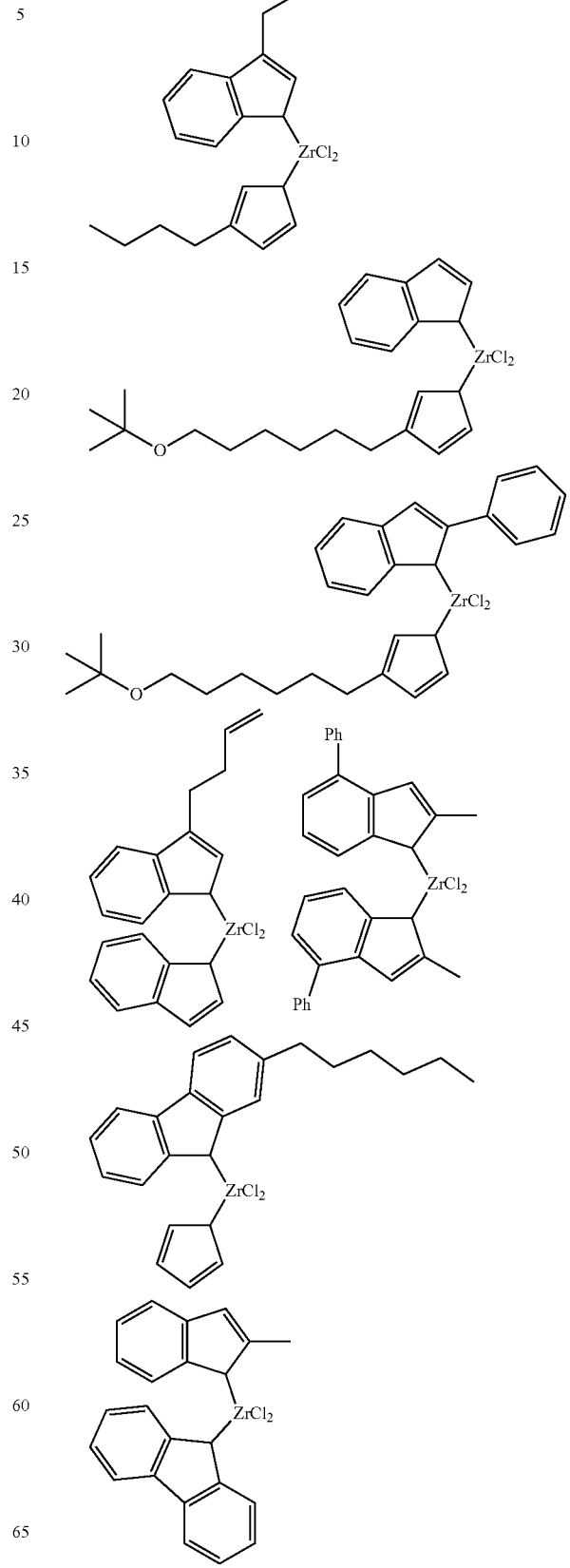

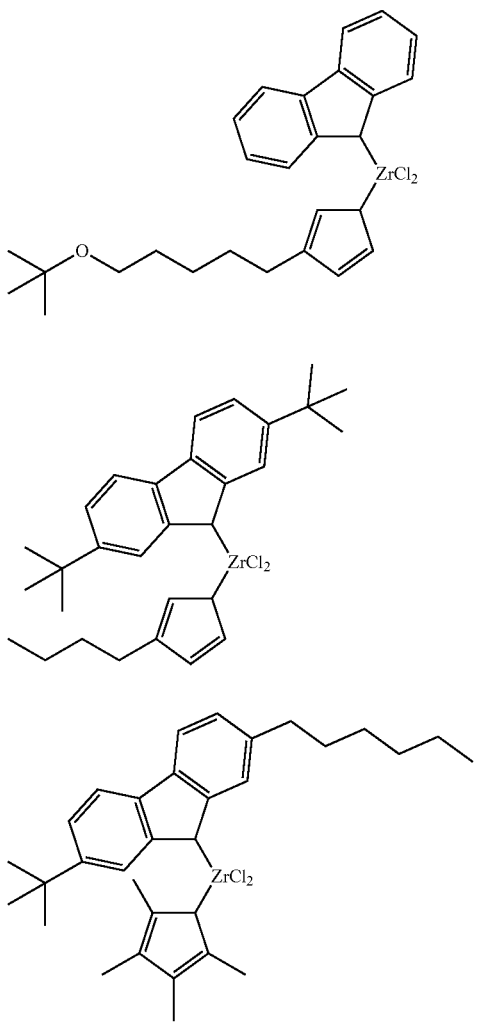
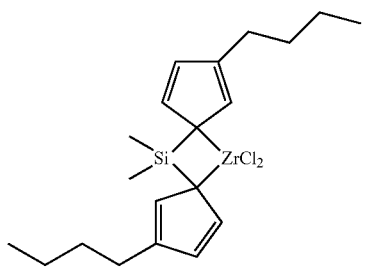
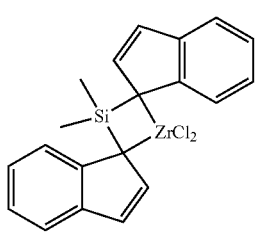
The metallocene compound represented by the chemical formula 5 may be, for example, a compound represented by the following structural formulas, but is not limited thereto.
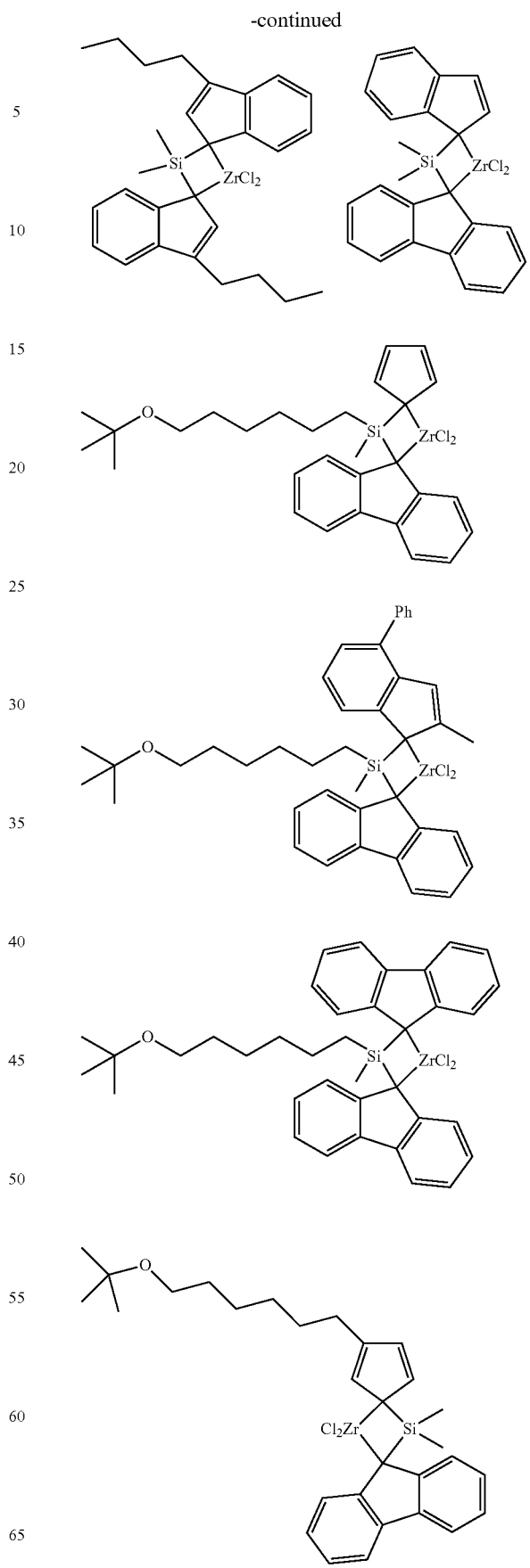

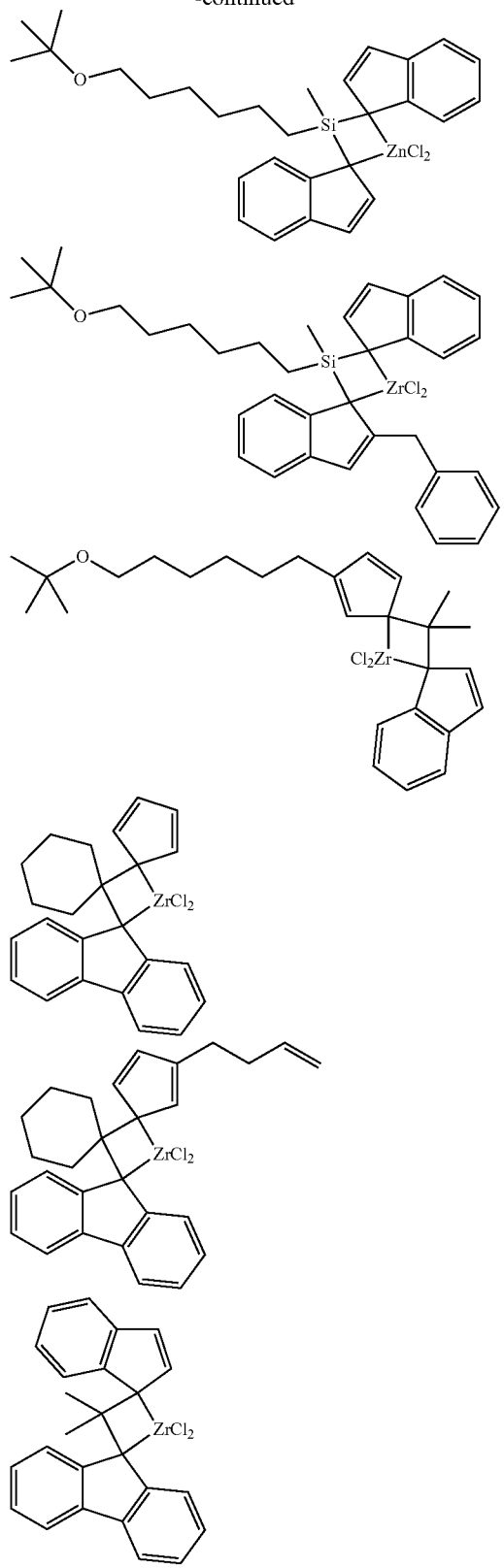
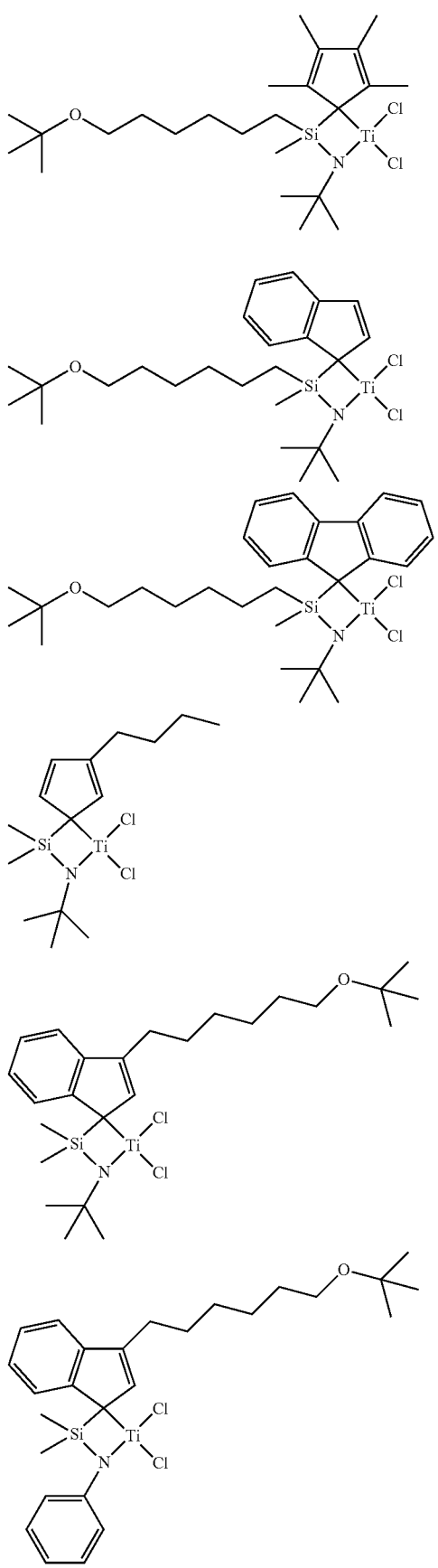
Further, the metallocene compound represented by the chemical formula 6 may be, for example, a compound represented by the following structural formulas, but is not limited thereto.

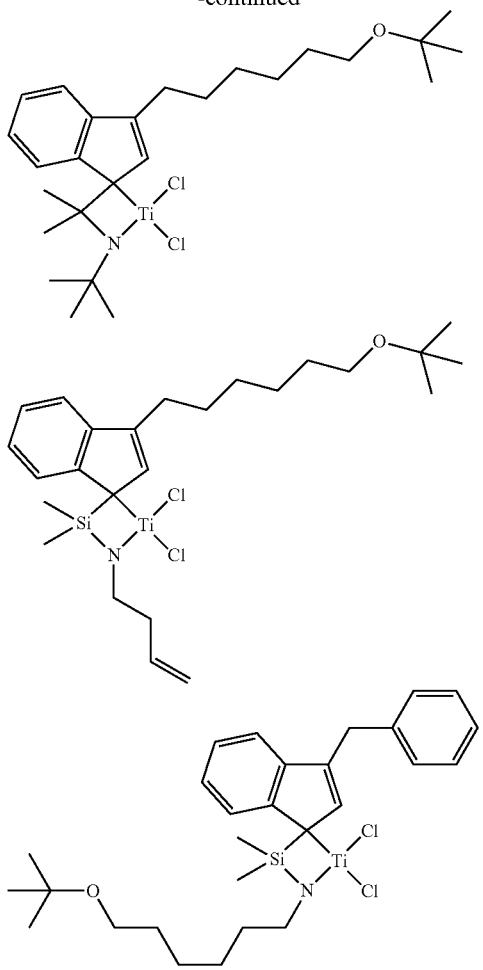

In addition, in the hybrid supported metallocene catalyst of the present invention, although the metallocene compound contains only one selected from the compounds represented by the chemical formulas (4) to (6) depending on the use of the formula (1), it is possible to produce an olefin polymer which has a broad molecular weight distribution and thus exhibit excellent physical properties as well as excellent processability, while being the high molecular weight olefin-based copolymer having a high short chain branch (SCB) content.

In the method for preparing a polyolefin according to the present invention, a cocatalyst to be supported together on the support for activating the metallocene compound is not particularly limited as long as it is an organometallic compound containing a Group 13 metal which can be used when polymerizing the olefin in the presence of a general metallocene catalyst.

According to an embodiment of the present invention, the cocatalyst contained in the metallocene catalyst may include one or more selected from the group consisting of compounds of the chemical formula 7 below.

$$R_{30}-[Al(R_{29})-O]_n-R_{31} \quad \text{[Chemical Formula 7]}$$

in the Chemical Formula 7, $R_{29}$, $R_{30}$ and $R_{31}$ are each independently any one of hydrogen, halogen, a hydrocarbyl group having 1 to 20 carbon atoms, and a hydrocarbyl group having 1 to 20 carbon atoms substituted with halogen, and n is an integer of 2 or more.

In addition, the present invention may further include a borate-based cocatalyst of the following general formula (8), as needed.

$$T^+[BQ_4]^- \quad \text{[Chemical Formula 8]}$$

in the Chemical Formula 8, $T^+$ is a monovalent polyatomic ion, B is boron in oxidation state +3, and each Q is independently selected from the group consisting of a hydride group, a dialkylamido group, a halide group, an alkoxide group, an aryloxide group, a hydrocarbyl group, a halocarbyl group, and a halo-substituted hydrocarbyl group, and the Q has less than 20 carbons, but Q is a halide group in position of one or less.

The cocatalyst of the chemical formula 7 may be an alkylaluminoxane-based compound in which a repeating unit is bonded in a linear, cyclic or network form, and specific examples of such cocatalyst may include methylaluminoxane (MAO), ethylaluminoxane, isobutyl aluminoxane, butylaluminoxane, and the like.

The borate-based cocatalyst of the chemical formula 8 may be a borate compound in the form of a tri-substituted ammonium salt, or a dialkylammonium salt, or a tri-substituted phosphonium salt.

Specific examples of the second cocatalyst include borate-based compounds in the form of tri-substituted ammonium salts such as trimethylammonium tetraphenylborate, methyldioctadecylammonium tetraphenyl borate, triethylammonium tetraphenylborate, tripropylammonium tetraphenylborate, tri(n-butyl)ammonium tetraphenylborate, methyltetradecyloctadecylammonium tetraphenyl borate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis (pentafluorophenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-diethylanilinium tetrakis (pentafluorophenyl)borate, N,N-dimethyl(2,4,6-trimethylanilinium) tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl) borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl) borate or N,N-dimethyl-(2,4,6-trimethylanilinium) tetrakis(2,3,4,6-tetrafluorophenyl) borate; borate compounds in the form of dialkylammonium salts such as dioctadecylammonium tetrakis(pentafluorophenyl)borate, ditetradecylammonium tetrakis(pentafluorophenyl)borate or dicyclohexylammonium tetrakis(pentafluorophenyl)borate; or a borate-based compound in the form of a tri-substituted phosphonium salt such as triphenylphosphonium tetrakis(pentafluorophenyl)borate, methyldioctadecylphosphonium tetrakis(pentafluorophenyl) borate or tri(2,6-dimethylphenyl)phosphonium tetrakis (pentafluorophenyl)borate.

The weight ratio of the total transition metal to the support included in the metallocene compound may be 1:10 to 1:1,000. When the support and the metallocene compound are contained in the above weight ratio, it is possible to exhibit the optimal shape.

In addition, the weight ratio of the cocatalyst compound to the support may be 1:1 to 1:100. Further, the weight ratio of the cocatalyst to the metallocene compound may be 10:1 to 1:10, preferably 5:1 to 1:5. When the cocatalyst and the metallocene compound are contained in the weight ratio, the activity and the polymer microstructure can be optimized.

In the method for preparing the polyolefin, as the support, a support containing a hydroxy group on its surface can be used, and preferably, a support having a highly reactive hydroxyl group and siloxane group, on which the surface is dried without moisture, can be used.

For example, silica, silica-alumina, and silica-magnesia that are dried at high temperature can be used, and may usually contain oxides, carbonates, sulfates, and nitrate components such as $Na_2O$, $K_2CO_3$, $BaSO_4$, and $Mg(NO_3)_2$.

The support is preferably dried at about 200 to 800° C., more preferably about 300 to 600° C., and most preferably about 300 to 400° C. If the drying temperature of the support is less than about 200° C., much moisture on its surface may be reacted with the cocatalyst. If the drying temperature is more than about 800° C., pores on the support surface are combined with each other to reduce surface area, the hydroxyl groups are removed and only the siloxane groups remain on the surface. Thus, the reactive sites with cocatalyst are reduced, which is not preferable.

An amount of hydroxyl group on the surface of support is preferably about 0.1 to 10 mmol/g, and more preferably about 0.5 to 1 mmol/g. The amount of hydroxyl group on the surface of support can be adjusted depending on the preparation method of the support and its conditions, or drying conditions such as temperature, time, vacuum, and spray drying.

If the amount of hydroxyl group is less than about 0.1 mmol/g, the reactive sites with cocatalyst are reduced. If the amount of hydroxyl group is more than about 10 mmol/g, it is likely to be caused by moisture, in addition to hydroxyl groups being present on the particle surface of support, which is not preferable.

In the metallocene supported catalyst, the weight ratio of the total transition metal:support contained in the metallocene compound may be about 1:10 to 1:1,000. When the support and the metallocene compound are contained in the weight ratio above, the optimal shape can be exhibited.

On the other hand, the metallocene supported catalyst according to the present invention can be prepared by supporting a cocatalyst on a support, supporting one kind of metallocene compound thereon, and then supporting a compound of the chemical formula 1. The method of supporting each component depends on the production process and conditions of a conventional metallocene supported catalyst, and thus a detailed description thereof will be omitted.

Further, in the method for preparing a polyolefin of the present invention, the olefin-based monomer is fed under conditions of using a reactor containing the compound of the chemical formula 1, the metallocene and the cocatalyst and a reactor into which the compound of the chemical formula 1 is injected, or under conditions of using a reactor containing a metallocene supported catalyst, thereby performing the polymerization.

At this time, according to one embodiment of the present invention, hydrogen gas can be further fed as needed during the polymerization of the olefin monomer. The hydrogen gas serves to suppress the rapid reaction of the metallocene catalyst at the initial stage of the polymerization, so that the high molecular weight polyolefin can be produced in a larger amount.

Therefore, by using such hydrogen gas, a polyolefin having a larger molecular weight and a broader molecular weight distribution can be effectively obtained. The injection amount of the hydrogen gas is not particularly limited and may be fed in an amount well known in the art.

On the other hand, an organoaluminum compound for removing water in the reactor is further injected in the reactor, and the polymerization reaction can proceed in the presence of the organoaluminum compound. Specific examples of such organoaluminum compound may include trialkylaluminum, dialkylaluminum halide, alkylaluminum dihalide, aluminum dialkylhydride or alkylaluminum sesquihalide, and the like. More specific examples thereof may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$, $(C_2H_5)_3Al_2Cl_3$, and the like. Such organoaluminum compounds can be continuously injected into the reactor and can be injected in a ratio of about 0.1 to 10 moles per kg of reaction medium injected into the reactor for proper moisture removal.

On the other hand, in the method for preparing a polyolefin according to one embodiment, the olefin-based monomer may be ethylene, alpha-olefin, cyclic olefin, and diene or triene olefin having at least two double bonds.

Specific example of the olefin-based monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, di-vinylbenzene, 3-chloromethylstyrene, and the like, and two or more of these monomers may be mixed and copolymerized.

The polymerization reaction may be carried out by homopolymerizing one olefin-based monomer or copolymerizing two or more monomers using one continuous slurry polymerization reactor, a loop slurry reactor, a gas phase reactor or a solution reactor.

Further, the metallocene supported catalyst can be injected into the reaction system after being dissolved or diluted using an aliphatic hydrocarbon solvent having 5 to 12 carbon atoms such as pentane, hexane, heptane, nonane, decane, isomers thereof, an aromatic hydrocarbon solvent such as toluene and benzene, or a hydrocarbon solvent substituted with a chlorine atom such as dichloromethane and dichlobenzene. The solvent used herein is treated with a trace amount of alkyl aluminum to remove a small amount of water or air acting as a catalyst poison, and a cocatalyst can be further used.

According to the preparation method of one embodiment described above, a high molecular weight or ultra high molecular weight polyolefin having a weight average molecular weight of about 100,000 to about 3,000,000 g/mol, or about 100,000 to about 2,000,000 g/mol can be obtained, which may have a molecular weight distribution (PDI, Mw/Mn) of about 2 to about 20, or about 3 to about 15.

As described above, in the method of the present invention, the molecular weight distribution can be adjusted by using one kind of metallocene catalyst, and in particular, ultra-high molecular weight polyolefin having a relatively broad molecular weight distribution and a very high molecular weight can be produced. Further, the present invention improves the activity and copolymerizability of the polymerization catalyst even when used with a small amount of the cocatalyst as compared with the conventional catalyst, thereby enabling the production of a high molecular weight polyolefin.

Hereinafter, the operation and effect of the invention will be described in more detail through concrete examples of the invention. However, these examples are merely illustrative of the invention and are not intended to limit the scope of the invention.

Preparation Example 1

Preparation of Catalyst Precursor (1) (K1)

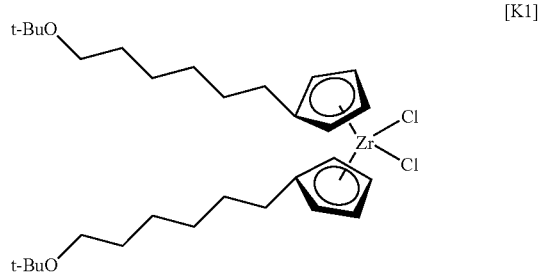

[K1]

1-(Tert-butoxy)-6-chlorohexane (e.g., t-butyl-O—(CH$_2$)$_6$—Cl) was prepared using 6-chlorohexanol by the method described in Tetrahedron Lett. 2951 (1988), and reacted with NaCp to obtain t-butyl-O—(CH$_2$)$_6$—C$_5$H$_5$ (yield: 60%, b.p. 80° C./0.1 mmHg).

Further, t-butyl-O—(CH$_2$)$_6$—C$_5$H$_5$ was dissolved in THF at −78° C., to which n-BuLi was added slowly, and the temperature was raised to room temperature and the reaction was carried out for 8 hours. The synthesized lithium salt solution was again added slowly to a suspension solution of ZrCl$_4$(THF)$_2$ (1.7 g, 4.5 mmol)/THF (30 mL) at −78° C. and the mixture was further reacted at room temperature for 6 hours. All volatile materials were dried under vacuum, and hexane solvent was added to the obtained oily liquid material and filtered out. The filtered solution was dried under vacuum and then hexane was added to induce a precipitate at low temperature (−20° C.).

The obtained precipitate was filtered out at a low temperature to obtain [t-Bu-O—(CH$_2$)$_6$—C$_5$H$_5$]$_2$ZrCl$_2$ compound in the form of a white solid. (yield: 92%)

$^1$H-NMR (300 MHz, CDCl$_3$): δ=6.28 (t, J=2.6 Hz, 2H), 6.19 (t, J=2.6 Hz, 2H), 3.31 (t, J=6.6 Hz, 2H), 2.62 (t, J=8 Hz), 1.7-1.3 (m, 8H), 1.17 (s, 9H)

$^{13}$C NMR (CDCl$_3$): 135.09, 116.66, 112.28, 72.42, 61.52, 30.66, 30.61, 30.14, 29.18, 27.58, 26.00

Preparation Example 2

Preparation of Catalyst Precursor 2(t-Bu-O—(CH$_2$)$_6$)(CH$_3$)Si(C$_5$(CH$_3$)$_4$)(tBu-N)TiCl$_2$)(K2)

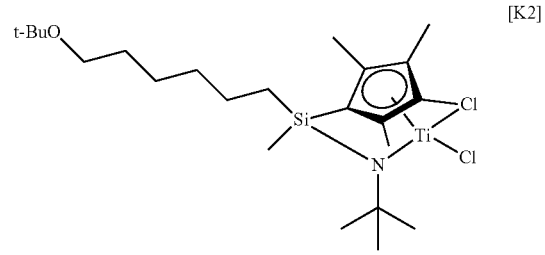

[K2]

50 g of Mg(s) was added to a 10 L reactor at room temperature and then 300 mL of THF was added.

After adding about 0.5 g of I$_2$, the temperature of the reactor was maintained at 50° C. After the temperature of the reactor was stabilized, 250 g of 6-t-butoxyhexyl chloride was added to the reactor at a rate of 5 mL/min using a feeding pump. By adding 6-t-butoxyhexyl chloride, it was observed that the temperature of the reactor was raised by about 4 to 5 degrees. The mixture was stirred for 12 hours while continuously adding 6-t-butoxyhexyl chloride.

After 12 hours of the reaction, a black reaction solution could be obtained. The produced black solution (2 mL) was taken to which water was added to obtain an organic layer. 6-t-butoxyhexane was confirmed through $^1$H-NMR, and it was found from 6-t-buthoxyhexane that Grignard reaction proceeded well. Thereby, 6-t-butoxyhexyl magnesium chloride was synthesized.

500 g of MeSiCl$_3$ and 1 L of THF were added to the reactor and then the reactor temperature was cooled to −20° C. 560 g of the synthesized 6-t-butoxyhexyl magnesium chloride was added to the reactor at a rate of 5 mL/min using a feeding pump.

After the feeding of Grignard reagent was finished, the reactor temperature was slowly raised to room temperature and stirred for 12 hours.

After 12 hours of the reaction, it was confirmed that white MgCl$_2$ salt was formed. 4 L of hexane was added and the salt was removed through labdori to obtain a filter solution.

The obtained filter solution was added to the reactor, and then hexane was removed at 70° C. to obtain a pale yellow liquid.

It was confirmed through $^1$H-NMR that the obtained liquid was a desired methyl (6-t-butoxyhexyl) dichlorosilane compound.

$^1$H-NMR (CDCl$_3$): δ=3.3 (t, 2H), 1.5 (m, 3H), 1.3 (m, 5H), 1.2 (s, 9H), 1.1 (m, 2H), 0.7 (s, 3H)

1.2 moles (150 g) of tetramethylcyclopentadiene and 2.4 L of THF were added to the reactor, and then the temperature of the reactor was cooled to −20° C.

480 mL of n-BuLi was added to the reactor at a rate of 5 mL/min using a feeding pump. After the addition of n-BuLi, the mixture was stirred for 12 hours while slowly raising the reactor temperature to room temperature. After 12 hours of the reaction, an equivalent amount of methyl(6-t-butoxyhexyl)dichlorosilane (326 g, 350 mL) was rapidly added to the reactor. The mixture was stirred for 12 hours while slowly raising the reactor temperature to room temperature.

After 12 hours of the reaction, THF was removed, and 4 L of hexane was added, and the salt was removed through labdori to obtain a filter solution. The filter solution was added to the reactor again, and then hexane was removed at 70° C. to obtain a yellow solution. It was confirmed through ¹H-NMR that the obtained yellow solution was methyl(6-t-butoxyhexyl) (tetramethylCpH) t-butylaminosilane) compound.

TiCl₃(THF)₃ (10 mmol) was added quickly to the ligand dilithium salt at −78° C. synthesized from n-BuLi and ligand dimethyl (tetramethylCpH) t-butylaminosilane in THF solution. The reaction solution was stirred for 12 hours while slowly raising the temperature from −78° C. to room temperature.

After stirring for 12 hours, an equivalent amount of PbCl₂ (10 mmol) was added to the reaction solution at room temperature, followed by stirring for 12 hours. After stirring for 12 hours, a dark black solution with a blue color was obtained. THF was removed from the resulting reaction solution, and hexane was added thereto to filter the product. After removal of hexane from the obtained filter solution, the desired [methyl(6-t-butoxyhexyl)silyl(η5-tetramethylCp)(t-butylamido)]TiCl₂ compound was confirmed through ¹H-NMR.

¹H-NMR (CDCl₃): δ=3.3 (s, 4H), 2.2 (s, 6H), 2.1 (s, 6G), 1.8~0.8 (m), 1.4 (s, 9H), 1.2 (s, 9H), 0.7 (3, 3H)

Preparation Example 3

[Preparation Method of Compound 1, Referred to as Tether MWE]

(1) Synthesis of t-Bu-O(CH₂)₆—C₅H₄]₂TiCl₂

[Reaction Scheme 1]

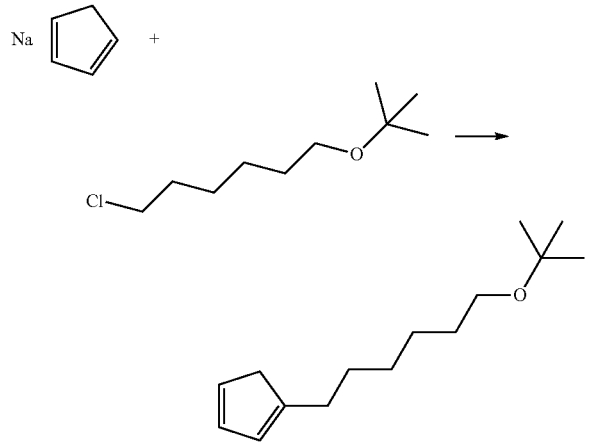

1-(Tert-butoxy)-6-chlorohexane (e.g., t-butyl-O—(CH₂)₆—Cl) prepared using 6-chlorohexanol by the method described in Tetrahedron Lett. 2951 (1988) was used in the reaction.

1.4 g (15 mmol) of NaC₅H₅ (hereinafter referred to as NaCp) was added to a dried flask and dissolved in 50 ml of THF. This solution was then reacted with 1.92 g (10 mmol) of 1-(tert-butoxy)-6-chlorohexane for 5 hours to obtain (1-(6-(tert-butoxy)hexyl) cyclopenta-1,3-diene(t-Bu-O (CH₂)₆—C₅H₅) (yield: 100%).

2.0 g (9.0 mmol) of 1-(6-(tert-butoxy)hexyl)cyclopenta-1,3-diene synthesized above was added slowly to a suspension solution of TiCl₄(THF)₂ (1.5 g, 4.5 mmol)/THF (30 ml) at −78° C., and then further reacted at room temperature for 6 hours to obtain a final reaction product solution.

The reaction product solution was filtered under a Schlenk glass filter to remove salts, and the filtered solution was vacuum-dried to remove all the solvent. Subsequently, hexane was added again to the resultant from which the solvent was removed to induce precipitation at a low temperature (−20° C.). The measured ¹H NMR data of [t-Bu-O(CH₂)₆—C₅H₄]₂TiCl₂ obtained was as follows.

¹H-NMR (300 MHz, CDCl₃): δ=6.28 (t, J=2.6 Hz, 2H), 6.19 (t, J=2.6 Hz, 2H), 3.31 (t, J=6.6 Hz, 2H), 2.62 (t, J=8 Hz, 2H), 1.7-1.3 (m, 8H), 1.17 (s, H)

(2) Preparation of Compound 1

[Reaction Scheme 2]

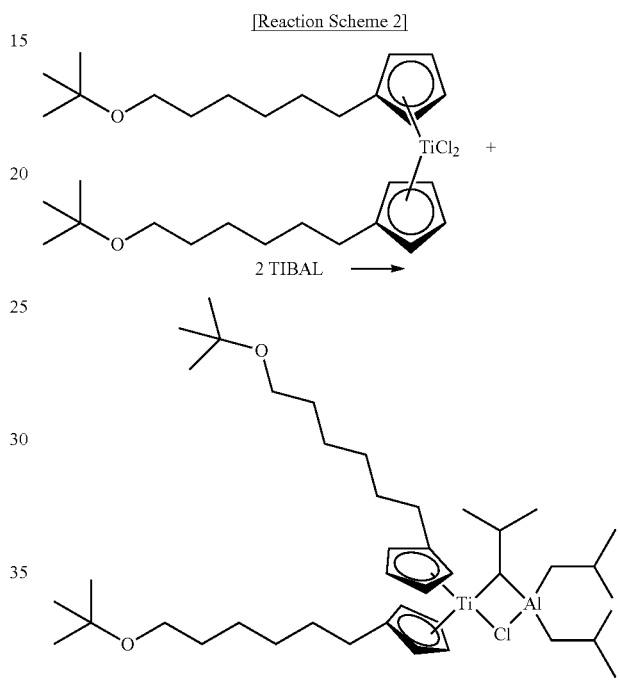

0.66 g of [t-Bu-O(CH₂)₆—C₅H₄]₂TiCl₂ and 50 mL of hexane were sequentially added to a 250 mL round bottom flask and then stirred. 6 ml of triisobutylaluminum was added thereto and the mixture was stirred at room temperature for 3 days, and then the solvent was removed in vacuum to obtain a blue mixture. This mixture was oxidized or not discolored in the reduction state of titanium. Subsequently, the blue mixture was used without purification process.

¹H-NMR (500 MHz, CDCl₃): δ=7.31 (br s, 10H), 2.43 (d, 4H), 1.95-1.2 (m, 28H), 1.2-0.9 (m, 19H)

Preparation Example 4

Preparation of Metallocene Supported Catalyst

A supported catalyst was prepared by supporting the catalyst precursor (1) of Preparation Example 1 and the compound 1 (tether MWE) of Preparation Example 3 on a support according to the following method.

(Drying of Support)

Silica (SYLOPOL 948 manufactured by Grace Davision) was dehydrated under vacuum at a temperature of 400° C. for 12 hours.

(Preparation of Supported Catalyst)

100 mL of toluene solution was added to a glass reactor at room temperature, and 10 g of the prepared silica was added thereto and the mixture was stirred while raising the reactor temperature to 40° C. After sufficiently dispersing silica, 60.6 mL of 10 wt % methylaluminoxane (MAO)/ toluene solution was added to the reactor, the temperature was raised to 80° C., and then the mixture was stirred at 200 rpm for 16 hours.

Subsequently, the temperature was lowered again to 40° C., and then washed with a sufficient amount of toluene to remove unreacted aluminum compound. Again, 100 mL of toluene was added thereto. Then, 0.5 mmol of the catalyst precursor (1) prepared in Preparation Example 1 was added to the reactor and stirred for 1 hour. Then, 0.05 mmol of the compound 1 (tether MWE) prepared in Example 1 was added so that the injection amount was 0.1 mole %, and the mixture was stirred for 2 hours. After completion of the reaction, the stirring was stopped, and the toluene layer was separated and removed. The remaining toluene was removed at 40° C. under reduced pressure to prepare an olefin supported catalyst.

Preparation Example 5

Preparation of Metallocene Supported Catalyst

A supported metallocene catalyst was prepared in the same manner as in Preparation Example 4, except that 0.5 mmol of the catalyst precursor (1) of Preparation Example 1 and 0.15 mmol of the compound 1 (tether MWE) of Example 1 were supported on a support.

Preparation Example 6

Preparation of Metallocene Supported Catalyst

A supported metallocene catalyst was prepared in the same manner as in Preparation Example 4, except that 0.5 mmol of the catalyst precursor (1) of Preparation Example 1 and 0.25 mmol of the compound 1 (tether MWE) of Example 1 were supported on a support.

Preparation Example 7

Preparation of Metallocene Supported Catalyst

A supported metallocene catalyst was prepared in the same manner as in Preparation Example 4, except that 0.5 mmol of the catalyst precursor (2) of Preparation Example 2 and 0.05 mmol of the compound 1 (tether MWE) of Example 1 were supported on a support.

Preparation Example 8

Preparation of Metallocene Supported Catalyst

A supported metallocene catalyst was prepared in the same manner as in Preparation Example 4, except that 0.5 mmol of the catalyst precursor (2) of Preparation Example 2 and 0.15 mmol of the compound 1 (tether MWE) of Example 1 were supported on a support.

Preparation Example 9

Preparation of Metallocene Supported Catalyst

A supported metallocene catalyst was prepared in the same manner as in Preparation Example 4, except that 0.5 mmol of the catalyst precursor (2) of Preparation Example 2 and 0.25 mmol of the compound 1 (tether MWE) of Example 1 were supported on a support.

Comparative Preparation Example 1

Preparation of Metallocene Supported Catalyst

A supported metallocene catalyst was prepared by supporting only the catalyst precursor (1) of Preparation Example 1 on a support according to the following method.

(Drying of Support)

Silica (SYLOPOL 948 manufactured by Grace Davision) was dehydrated under vacuum at a temperature of 400° C. for 12 hours.

(Preparation of Supported Catalyst)

100 mL of toluene solution was added to a glass reactor at room temperature, and 10 g of the prepared silica was added thereto and the mixture was stirred while raising the reactor temperature to 40° C. After sufficiently dispersing silica, 60.6 mL of 10 wt % methylaluminoxane (MAO)/ toluene solution was added to the reactor, the temperature was raised to 80° C., and then the mixture was stirred at 200 rpm for 16 hours.

Subsequently, the temperature was lowered again to 40° C., and then washed with a sufficient amount of toluene to remove unreacted aluminum compound. Again, 100 mL of toluene was added thereto. Then, 0.5 mmol of the catalyst precursor (1) prepared in Preparation Example 1 was added and stirred for 2 hours. After completion of the reaction, the stirring was stopped, and the toluene layer was separated and removed. The remaining toluene was removed at 40° C. under reduced pressure to prepare an olefin supported catalyst.

Comparative Preparation Example 2

A supported catalyst was prepared in the same manner as in Comparative Preparation Example 1, except that only the catalyst precursor (2) of Preparation Example 2, instead of the catalyst precursor (1) of Preparation Example 1, was supported on a support.

Comparative Example 1

Solution Polymerization

The catalyst precursor (1) (20 μmol) was added to a flask under Ar, to which 20 mL of toluene was added and stirred to make a 1 mM catalyst solution.

Two 300 mL Andrew bottles were prepared and assembled with an impeller part, and then the inside of the glove box was replaced with argon. 180 mL of toluene was added inside the glove box-treated Andrew bottle (a small amount of TMA was prescribed), in which 10 mL of MAO (10 wt % toluene) solution was injected.

5 mL (5 pmol) of 1 mM catalyst solution. (toluene) was injected into the reactor. After fixing the top of the bottle with a mechanical stirrer while each was immersed in an oil bath heated to 90° C., 5 mL of 1-hexene used as a comonomer was injected into either of the two Andrew bottles. The inside of the bottle was purged with ethylene gas three times, the ethylene valve was opened, and a mechanical stirrer was operated and reacted at 500 rpm for 30 minutes. During the reaction, the vortex line inside the container was frequently checked, and when this line became flat, the reaction was terminated at an early stage.

After the reaction, the temperature was lowered to room temperature, and the gas inside the vessel was vented. The contents were poured into about 400 mL of ethanol, stirred for about 1 hour, then filtered, and the resulting polymer was dried in a vacuum oven set at 60° C. for 20 hours. The weight of the obtained polymer was calculated, and the activity of the catalyst was calculated therefrom. 10 mg of sample was taken, and analyzed by GPC to confirm the molecular weight and degree of distribution.

That is, the catalyst activity, Mw and PDI were measured for the obtained polyolefin, and the results are shown in Table 1 below.

Comparative Example 2

A polyolefin was prepared in the same manner as in Comparative Example 1, except that a Tebbe reagent ((C$_5$H$_5$)$_2$TiCH$_2$ClAl(CH$_3$)$_2$) is further fed to the reactor through another line so as to be 0.1 mole % relative to 1 mmol of the catalyst precursor (1) during the polymerization.

The catalyst activity, Mw and PDI were measured for the obtained polyolefin, and the results are shown in Table 1 below.

Comparative Example 3

A polyolefin was prepared in the same manner as in Comparative Example 1, except that the catalyst precursor (2) of Preparation Example 2 was used instead of the catalyst precursor (1) of Preparation Example 1.

The catalyst activity, Mw and PDI were measured for the obtained polyolefin, and the results are shown in Table 1 below.

Comparative Example 4

A polyolefin was prepared in the same manner as in Comparative Example 1, except that a Tebbe reagent ((C$_5$H$_5$)$_2$TiCH$_2$ClAl(CH$_3$)$_2$) is further fed to the reactor through another line so as to be 0.1 mole % relative to 1 mmol of the catalyst precursor (2) during the polymerization.

The catalyst activity, Mw and PDI were measured for the obtained polyolefin, and the results are shown in Table 1 below.

Example 1

A polyolefin was prepared in the same manner as in Comparative Example 1, except that the compound 1 (tether MWE) of Preparation Example 3 was further fed to the reactor through another line so as to be 0.1 mole % relative to 1 mmol of the catalyst precursor (1) during the polymerization.

The catalyst activity, Mw and PDI were measured for the obtained polyolefin, and the results are shown in Table 1 below.

Example 2

A polyolefin was prepared in the same manner as in Comparative Example 1, except that the compound 1 (tether MWE) of Preparation Example 3 was further fed to the reactor through another line so as to be 0.1 mole % relative to 1 mmol of the catalyst precursor (2) during the polymerization.

The catalyst activity, Mw and PDI were measured for the obtained polyolefin, and the results are shown in Table 1 below.

Example 3

A polyolefin was prepared in the same manner as in Example 1, except that the compound 1 (tether MWE) of Preparation Example 3 was further fed to the reactor through another line so as to be 0.05 mol % relative to 1 mmol of the catalyst precursor (1) during the polymerization.

The catalyst activity, Mw and PDI were measured for the obtained polyolefin, and the results are shown in Table 1 below.

Example 4

A polyolefin was prepared in the same manner as in Example 2, except that the compound 1 (tether MWE) of Preparation Example 3 was further fed to the reactor through another line so as to be 0.05 mol % relative to 1 mmol of the catalyst precursor (2) during the polymerization.

The catalyst activity, Mw and PDI were measured for the obtained polyolefin, and the results are shown in Table 1 below.

TABLE 1

| | | Solution polymerization | | | | |
| | | Cocatalyst/mol % (added during polymerization) | | Activity | | |
| | Catalyst | Tether MWE | Tebbe reagent | (kgPE/ mmol/hr) | Mw | PDI |
| --- | --- | --- | --- | --- | --- | --- |
| Example 1 | catalyst precursor (1) | 0.1 | — | 6.4 | 101,000 | 12.9 |
| Example 2 | catalyst precursor (2) | 0.1 | — | 4.8 | 277,200 | 8.6 |
| Example 3 | catalyst precursor (1) | 0.05 | — | 7.2 | 88,000 | 10.2 |
| Example 4 | catalyst precursor (2) | 0.05 | — | 6.1 | 237,000 | 4.6 |
| Comparative Example 1 | catalyst precursor (1) | — | — | 6.9 | 63,000 | 6.8 |
| Comparative Example 2 | catalyst precursor (1) | — | 0.1 | 5.9 | 69,000 | 8.2 |
| Comparative Example 3 | catalyst precursor (2) | — | — | 5.0 | 200,000 | 3.5 |
| Comparative Example 4 | catalyst precursor (2) | — | 0.1 | 3.8 | 234,000 | 4.5 |

As shown in Table 1, it was confirmed that in Examples 1 to 4 of the present invention, a polyolefin having a broad molecular weight distribution while having generally high molecular weight was produced.

In particular, when 0.1 mol % of the existing Tebbe reagent was used, the effect of increasing the molecular weight in solution polymerization is insignificant, whereas in the present invention, the effect of increasing the molecular weight when used with the same amount as the Tebbe reagent was very large. Further, as shown in Examples 3 and 4 of the present invention, it was confirmed that the present invention could exhibit excellent effects even when the amount of tether MWE was reduced.

On the other hand, although Comparative Example 1 showed similar catalytic activity to that in the present invention, the molecular weight of the polyolefin was low and the molecular weight distribution was narrow. In addition, Comparative Example 2 attempted to broaden the molecular weight distribution using a Tebbe reagent as an additive, but it was lower than that of Example 2 of the present invention, and the molecular weight of the polyolefin was also low. Further, Comparative Example 3 showed that the molecular weight of the polyolefin high, but the molecular weight distribution became narrower. In addition, Comparative Example 4 showed that the molecular weight was high but the catalytic activity was very low and the molecular weight distribution was narrow.

Examples 5 to 10 and Comparative Examples 5 to 6

Slurry Polymerization (Semi-Batch Homopolymerization of Ethylene)

30 mg of each of the supported catalysts of Preparation Examples 4 to 9 and Comparative Preparation Examples 1 to 4 was quantitatively measured in a dry box and placed in a 50 mL glass bottle, respectively, then sealed with a rubber septum, and taken out from a dry box to prepare a catalyst to be injected.

The polymerization was carried out in a 2 L metal alloy reactor equipped with a mechanical stirrer, capable of performing temperature adjustment and being used at high pressure. At this time, in the case of Comparative Examples 7 and 8, the supported catalysts of Comparative Preparation Examples 1 and 2 were used, and Compound 1 of Preparation Example 3 was fed to the reactor through another line during polymerization.

1.2 L of hexane containing 1.0 mmol of triethylaluminum was injected into the reactor, and each of the prepared supported catalysts was injected into the reactor without air contact. Then, the polymerization was carried out for one hour while continuously adding a gaseous ethylene monomer at a pressure of 40 Kgf/cm$^2$. The polymerization was completed by first stopping the stirring and then exhausting and removing ethylene. The resulting polymer was filtered to remove most of the polymer solvent, and then dried in a vacuum oven at 80° C. for 4 hours.

The catalytic activity, Mw and PDI of the obtained polyolefin were measured, and the results are shown in Table 2 below.

Comparative Examples 7 to 8

The polymerization condition was the same as the slurry polymerization condition of Examples 5 to 10 and Comparative Examples 5 to 6, but the compound (tether MWE) of Preparation Example 3 was further fed to the reactor at the time of adding each compound, thereby performing polymerization.

The catalytic activity, Mw and PDI of the obtained polyolefin were measured, and the results are shown in Table 2 below.

Comparative Examples 9 to 10

The polymerization condition was the same as the slurry polymerization condition of Examples 5 to 10 and Comparative Examples 5 to 6, but Tebbe reagent (($C_5H_5$)$_2$TiCH$_2$ClAl(CH$_3$)$_2$) was further fed to the reactor at the time of adding each compound, thereby performing polymerization.

The catalytic activity, Mw and PDI of the obtained polyolefin were measured, and the results are shown in Table 2 below.

TABLE 2

| | | Slurry polymerization of supported catalyst | | | | |
| | | Cocatalyst/mol % | | Activity (kgPE/ | | |
| | Catalyst | Tether MWE | Tebbe reagent | mmol/hr) | Mw | PDI |
|---|---|---|---|---|---|---|
| Example 5 | Preparation Example 4 (support/catalyst precursor (1)) | 0.1 | — | 14.8 | 567,000 | 3.8 |
| Example 6 | Preparation Example 5 (support/catalyst precursor (1)) | 0.3 | — | 12.2 | 683,500 | 4.4 |
| Example 7 | Preparation Example 6 (support/catalyst precursor (1)) | 0.5 | — | 8.8 | 977,120 | 6.1 |
| Example 8 | Preparation Example 7 (support/catalyst precursor (2)) | 0.1 | — | 2.6 | 1,207,200 | 3.2 |
| Example 9 | Preparation Example 8 (support/catalyst precursor (2)) | 0.3 | — | 2.3 | 1,665,400 | 3.9 |
| Example 10 | Preparation Example 9 (support/catalyst precursor (2)) | 0.5 | — | 1.1 | 1,899,900 | 4.9 |
| Comparative Example 5 | Comparative Preparation Example 1 (catalyst precursor (1)) | — | — | 15.1 | 167,100 | 2.1 |
| Comparative Example 6 | Comparative Preparation Example 2 (catalyst precursor (2)) | — | — | 2.4 | 1,133,300 | 2.2 |

TABLE 2-continued

Slurry polymerization of supported catalyst

| | Catalyst | Cocatalyst/mol % Tether MWE | Tebbe reagent | Activity (kgPE/ mmol/hr) | Mw | PDI |
|---|---|---|---|---|---|---|
| Comparative Example 7 | Comparative Preparation Example 1 (support/catalyst precursor (1)) | Added During Polymerization 0.1 | — | 10.2 | 913,000 | 2.8 |
| Comparative Example 8 | Comparative Preparation Example 2 (support/catalyst precursor (2)) | Added During Polymerization 0.1 | — | 2.1 | 1,660,700 | 2.5 |
| Comparative Example 9 | Comparative Preparation Example 1 (support/catalyst precursor (1)) | — | 0.1 | 14.0 | 173,000 | 2.8 |
| Comparative Example 10 | Comparative Preparation Example 2 (support/catalyst precursor (2)) | — | 0.1 | 1.2 | 1,667,300 | 2.8 |

As shown in Table 2, it was confirmed that, in Examples 5 to 10 of the present invention, a metallocene catalyst obtained by supporting the chemical formula 1 was used in one reactor during slurry polymerization, and thereby, even another additive was not used in the reactor, not only various catalytic activities were exhibited but also polyolefin having a broad molecular weight distribution and a high molecular weight as compared with Comparative Examples 5 to 10 was produced. Therefore, the present invention could improve the performance of the metallocene supported catalyst by more effectively supporting the chemical formula 1 on the support as compared with the prior art, whereby the polymer having various molecular weight distributions could be provided.

Although specific parts of the contents of the present invention have been described in detail, it will be apparent to those skilled in the art that such a specific technique is merely a preferred embodiment and the scope of the invention is not restricted thereto. Accordingly, the substantial scope of the invention will be defined by the appended claims and their equivalents.

The invention claimed is:

1. A method for preparing a polyolefin comprising:

providing a metallocene catalyst comprising a metallocene compound, a cocatalyst and a compound of Chemical Formula 1, which are supported on a support selected from the group consisting of silica, silica-alumina, and silica-magnesia in a single solvent-containing reactor, and polymerizing an olefin monomer in the presence of the metallocene catalyst:

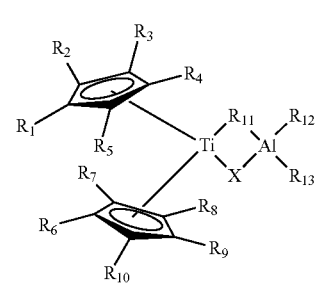

[Chemical Formula 1]

wherein, in Chemical Formula 1, $R_1$ to $R_{10}$ are each independently hydrogen, a linear or branched alkyl, alkoxy or alkoxyalkyl having 1 to 10 carbon atoms, $R_{11}$ is a linear or branched alkylene group having 1 to 10 carbon atoms, or halogen, $R_{12}$ and $R_{13}$ are each independently a linear or branched alkyl group having 1 to 10 carbon atoms, or halogen, and X is a halogen atom, wherein, in the metallocene catalyst, the compound of Chemical Formula 1 is included in a molar ratio of 0.05 to 1 with respect to 1 mole of a transition metal contained in the metallocene compound, wherein an amount of hydroxyl group on the surface of the support is 0.1 to 10 mmol/g, wherein a weight ratio of the total transition metal included in the metallocene compound to the support is 1:10 to 1:1,000, wherein a weight ratio of the cocatalyst to the support is 1:1 to 1:100, wherein the step of polymerizing the olefin monomer includes solution polymerization including a step of performing slurry polymerization including a step of injecting a metallocene-supported catalyst in which the metallocene compound, the cocatalyst and the compound of Chemical Formula 1 are supported on the support, in the reactor, and performing slurry polymerization while adding the olefin-based monomer to the reactor.

2. The method for preparing a polyolefin according to claim 1, wherein at least one of $R_1$ to $R_{10}$ in Chemical Formula 1 is an alkoxyalkyl having 1 to 10 carbon atoms.

3. The method for preparing a polyolefin according to claim 1, wherein at least one of $R_1$ to $R_{10}$ in Chemical Formula 1 is an alkoxyalkyl having 8 to 10 carbon atoms.

4. The method for preparing a polyolefin according to claim 1, wherein, in Chemical Formula 1, $R_{11}$ is a branched alkylene group having 4 to 10 carbon atoms, and $R_{12}$ and $R_{13}$ are each independently an alkyl group having 4 to 10 carbon atoms.

5. The method for preparing a polyolefin according to claim 1, wherein the compound of Chemical Formula 1 is prepared by reacting a compound of Chemical Formula 2 with an organoaluminum compound of Chemical Formula 3 in a solvent:

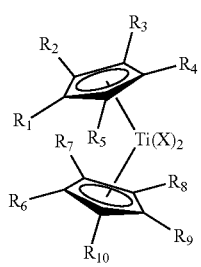

[Chemical Formula 2]

wherein, in Chemical Formula 2, $R_1$ to $R_{10}$ are each independently hydrogen, a linear or branched alkyl, alkoxy or alkoxyalkyl having 1 to 10 carbon atoms, and X is halogen;

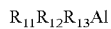

[Chemical Formula 3]

wherein, in Chemical Formula 3,
$R_{11}$, $R_{12}$ and $R_{13}$ are each independently a linear or branched alkyl group having 1 to 10 carbon atoms or a halogen, and at least one of $R_{11}$, $R_{12}$ and $R_{13}$ is a linear or branched alkyl group having 1 to 10 carbon atoms.

6. The method for preparing a polyolefin according to claim 1, wherein the metallocene compound contained in the metallocene catalyst is selected from the compounds represented by the following Chemical Formulas 4 to 6:

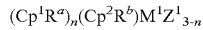

[Chemical Formula 4]

wherein, in Chemical Formula 4,
$M^1$ is a Group 4 transition metal;
$Cp^1$ and $Cp^2$ are the same as or different from each other and are each independently any one selected from the group consisting of cyclopentadienyl, indenyl, 4,5,6,7-tetrahydro-1-indenyl, and fluorenyl radical, each of which may be substituted with hydrocarbon having 1 to 20 carbon atoms;
$R^a$ and $R^b$ are the same as or different from each other and are each independently hydrogen, a $C_1$-$C_{20}$ alkyl, a $C_1$-$C_{10}$ alkoxy, a $C_2$-$C_{20}$ alkoxyalkyl, a $C_6$-$C_{20}$ aryl, a $C_6$-$C_{10}$ aryloxy, a $C_2$-$C_{20}$ alkenyl, a $C_7$-$C_{40}$ alkylaryl, a $C_7$-$C_{40}$ arylalkyl, a $C_8$-$C_{40}$ arylalkenyl, or a $C_2$-$C_{10}$ alkynyl;
$Z^1$ is a halogen atom, a $C_1$-$C_{20}$ alkyl, a $C_2$-$C_{10}$ alkenyl, a $C_7$-$C_{40}$ alkylaryl, a $C_1$-$C_{40}$ arylalkyl, a $C_6$-$C_{20}$ aryl, a substituted or unsubstituted $C_1$-$C_{20}$ alkylidene, a substituted or unsubstituted amino group, a $C_2$-$C_{20}$ alkylalkoxy, or a $C_7$-$C_{40}$ arylalkoxy; and
n is 1 or 0;

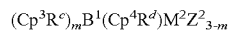

[Chemical Formula 5]

wherein, in Chemical Formula 5,
$M^2$ is a Group 4 transition metal;
$Cp^3$ and $Cp^4$ are the same as or different from each other and are each independently any one selected from the group consisting of cyclopentadienyl, indenyl, 4,5,6,7-tetrahydro-1-indenyl, and fluorenyl radical, each of which may be substituted by hydrocarbon having 1 to 20 carbon atoms;
$R^c$ and $R^d$ are the same as or different from each other and are each independently hydrogen, a $C_1$-$C_{20}$ alkyl, a $C_1$-$C_{10}$ alkoxy, a $C_2$-$C_{20}$ alkoxyalkyl, a $C_6$-$C_{20}$ aryl, a $C_6$-$C_{10}$ aryloxy, a $C_2$-$C_{10}$ alkenyl, a $C_7$-$C_{40}$ alkylaryl, a $C_7$-$C_{40}$ arylalkyl, a $C_8$-$C_{40}$ arylalkenyl, or a $C_2$-$C_{10}$ alkynyl;
$Z^2$ is a halogen atom, a $C_1$-$C_{20}$ alkyl, a $C_2$-$C_{10}$ alkenyl, a $C_7$-$C_{40}$ alkylaryl, a $C_7$-$C_{40}$ arylalkyl, a $C_6$-$C_{20}$ aryl, a substituted or unsubstituted $C_1$-$C_{20}$ alkylidene, a substituted or unsubstituted amino group, a $C_2$-$C_{20}$ alkylalkoxy, or a $C_7$-$C_{40}$ arylalkoxy;
$B^1$ is at least one of carbon, germanium, silicon, phosphorus or nitrogen atom containing radicals, or a combination thereof, which crosslinks $Cp^3R^c$ ring and $Cp^4R^d$ ring or crosslinks one $Cp^4R^d$ ring to $M^2$; and
m is 1 or 0;

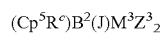

[Chemical Formula 6]

wherein, in Chemical Formula 6,
$M^3$ is a Group 4 transition metal;
$Cp^5$ is any one selected from the group consisting of cyclopentadienyl, indenyl, 4,5,6,7-tetrahydro-1-indenyl, and fluorenyl radical, each of which may be substituted with hydrocarbon having 1 to 20 carbon atoms;
$R^e$ is hydrogen, a $C_1$-$C_{20}$ alkyl, a $C_1$-$C_{10}$ alkoxy, a $C_2$-$C_{20}$ alkoxyalkyl, a $C_6$-$C_{20}$ aryl, a $C_6$-$C_{10}$ aryloxy, a $C_2$-$C_{20}$ alkenyl, a $C_7$-$C_{40}$ alkylaryl, a $C_7$-$C_{40}$ arylalkyl, a $C_8$-$C_{40}$ arylalkenyl, or a $C_2$-$C_{10}$ alkynyl;
$Z^3$ is a halogen atom, a $C_1$-$C_{20}$ alkyl, a $C_2$-$C_{10}$ alkenyl, a $C_7$-$C_{40}$ alkylaryl, a $C_7$-$C_{40}$ arylalkyl, a $C_6$-$C_{20}$ aryl, a substituted or unsubstituted $C_1$-$C_{20}$ alkylidene, a substituted or unsubstituted amino group, a $C_2$-$C_{20}$ alkylalkoxy, or a $C_7$-$C_{40}$ arylalkoxy;
$B^2$ is at least one of carbon, germanium, silicon, phosphorus or nitrogen atom containing radicals, or a combination thereof, which crosslinks $Cp^5R^e$ ring and J; and
J is any one selected from the group consisting of $NR^f$, O, $PR^f$ and S, where the $R^f$ is $C_1$-$C_{20}$ alkyl, aryl, substituted alkyl or substituted aryl.

7. The method for preparing a polyolefin according to claim 1, wherein the cocatalyst contained in the metallocene catalyst includes one or more selected from the group consisting of compounds represented by Chemical Formula 7:

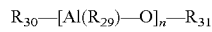

wherein, in Chemical Formula 7, $R_{29}$, $R_{30}$ and $R_{31}$ are each independently any one of hydrogen, halogen, a hydrocarbyl group having 1 to 20 carbon atoms, and a hydrocarbyl group having 1 to 20 carbon atoms substituted with halogen, and n is an integer of 2 or more.

8. The method for preparing a polyolefin according to claim 1, wherein the olefin-based monomer includes at least one monomer selected from the group consisting of ethylene, propylene, 1-butene, 1-hexene, 1-octene, 1-pentene, 4-methyl-1-pentene, 1-heptene, 1-decene, 1-undecene, 1-dodecene, norbornene, ethylidenenorbornene, styrene, alpha-methylstyrene and 3-chloromethylstyrene.

9. The method for preparing a polyolefin according to claim 1, wherein the weight average molecular weight of the polyolefin is 100,000 to about 3,000,000 g/mol.

10. The method for preparing a polyolefin according to claim 1, wherein the molecular weight distribution is 2 to 20.

* * * * *